April 13, 1965     H. W. HEIN     3,178,145
SPRAYING APPARATUS
Filed Oct. 10, 1962          3 Sheets-Sheet 2
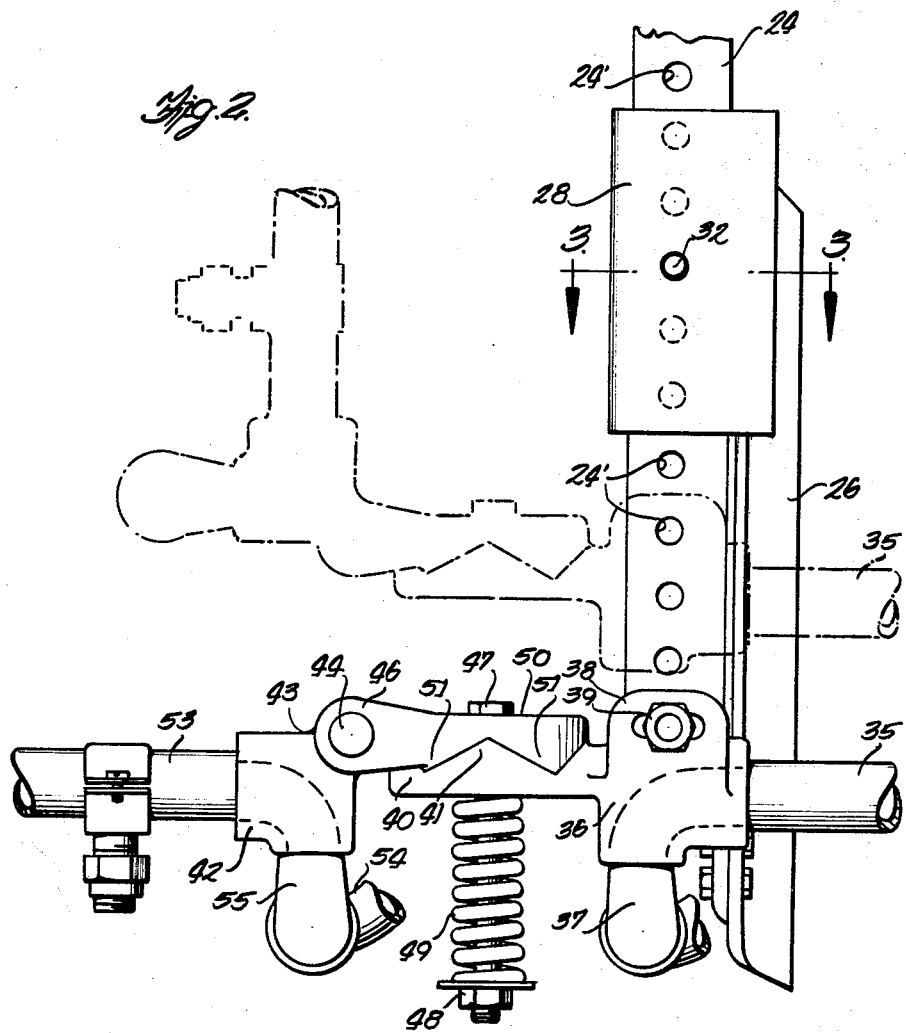
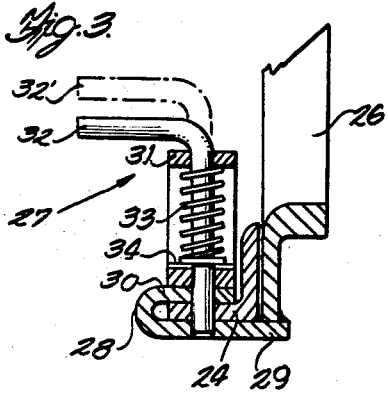
Inventor
Harold W. Hein

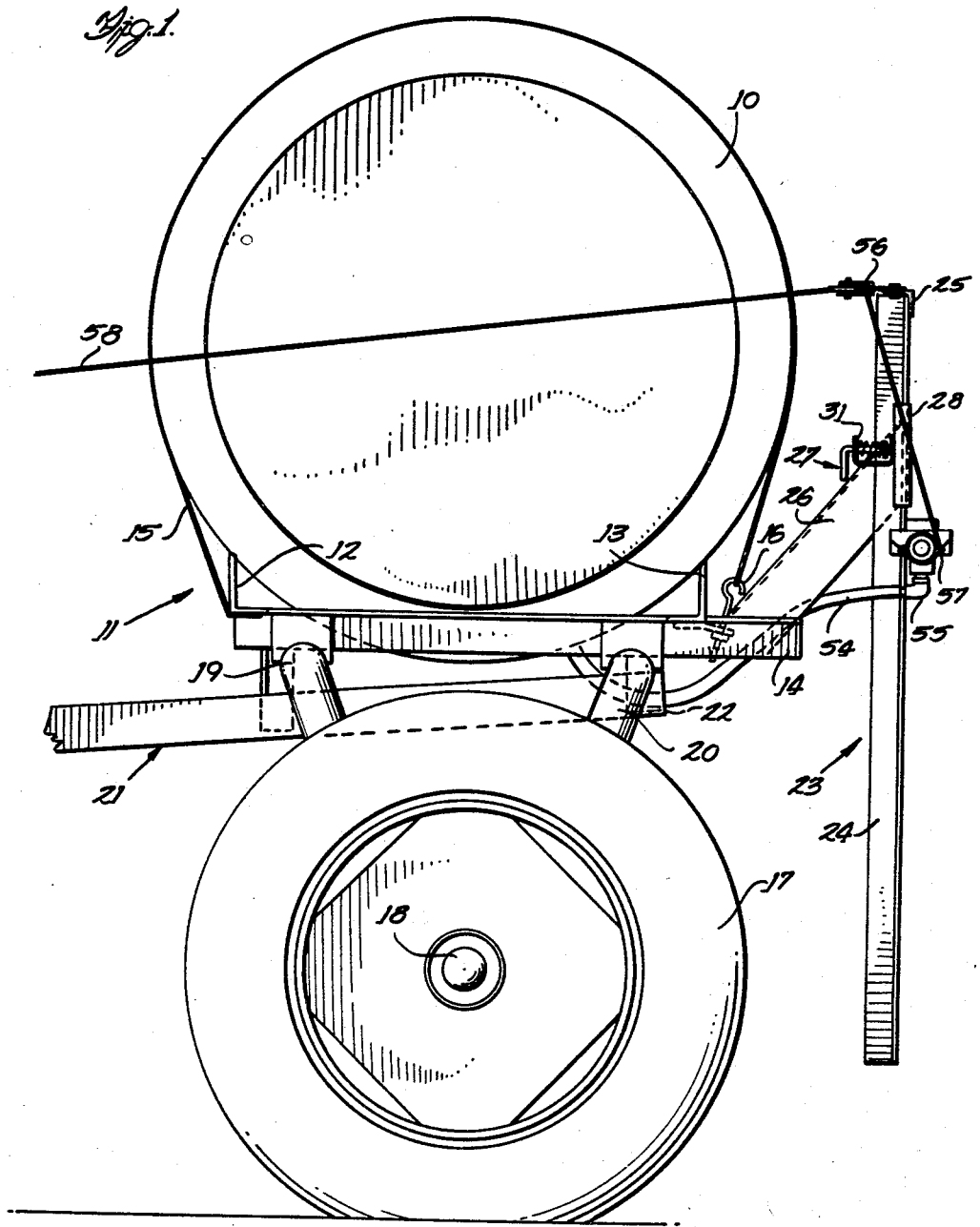

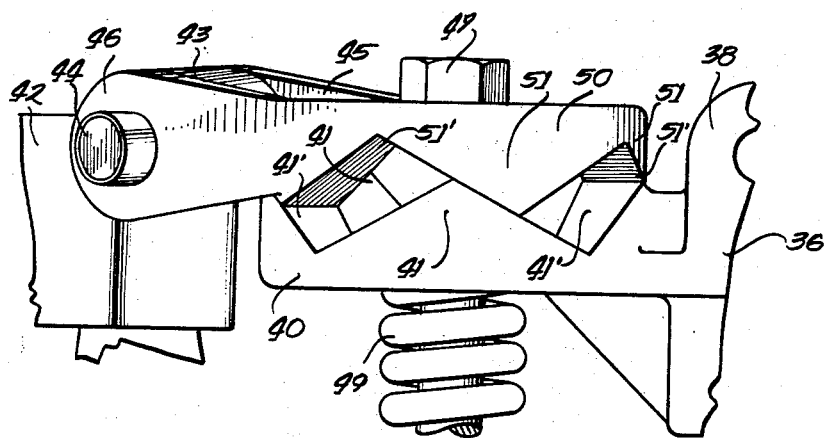
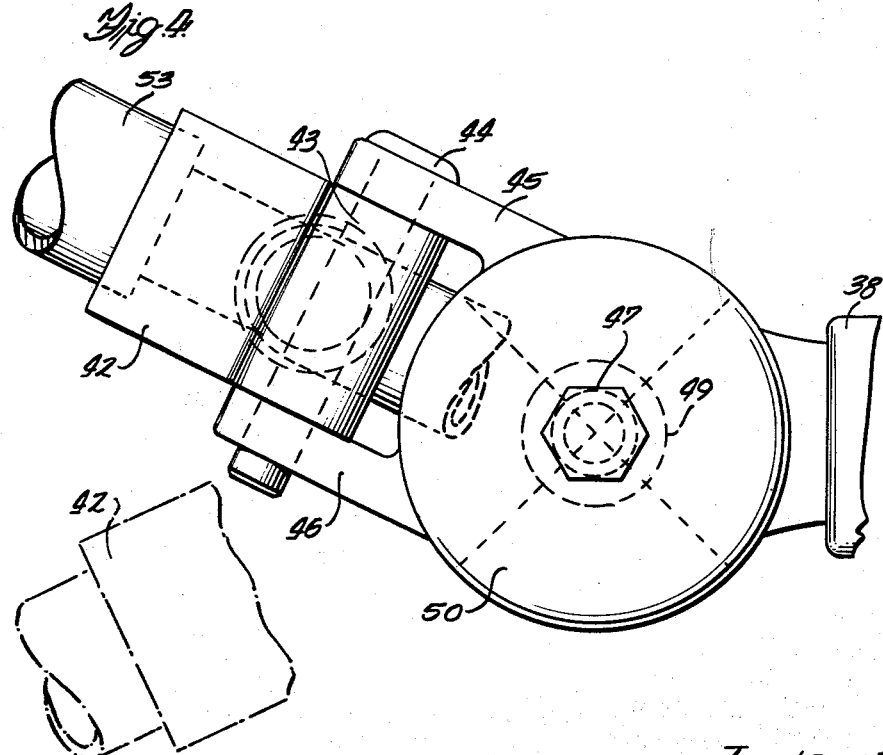

United States Patent Office 3,178,145
Patented Apr. 13, 1965

3,178,145
SPRAYING APPARATUS
Harold W. Hein, Western Springs, Ill., assignor to International Harvester Company, Chicago, Ill., a corporation of New Jersey
Filed Oct. 10, 1962, Ser. No. 229,764
3 Claims. (Cl. 248—283)

This invention relates in general to spraying apparatus, and more in particular to a new and improved trailing type of sprayer which is utilized to dispense chemicals or fertilizer upon crops to induce healthy and abundant growth.

In the past it has been known to mount a fluid-containing tank upon a mobile frame, having a pump and appropriate control means, to provide a central fluid-dispensing boom which extends transversely across the frame. It has also been conventional to provide outrigger fluid-dispensing booms which extend laterally outwardly from the frame, and which are swingably connected to the frame to allow pivoting movement when the outrigger booms encounter an obstruction. Such prior art devices have proved to be unsatisfactory for several reasons. For example, in some known designs the swingable connection between the outrigger booms and the vehicle frame were so resilient that the outrigger booms swayed with respect to the vehicle frame during normal spraying operation, which resulted in an uneven distribution of fluid. In other known devices where the connection between the outrigger booms and the vehicle frame is of the latch variety, it has been found that the boom has either exhibited a tendency to become unlatched while the vehicle is in motion across a field, or that the latch is of such tenacity that it will not unlatch even when the boom encounters an immovable obstruction. It is therefore a principal object of the present invention to provide a breakaway coupling for an outrigger boom which will enable the sprayer boom to remain stable while the machine is in motion across a field, yet which will swing freely with respect to the vehicle frame when an obstruction is encountered.

It is a further object of the invention to provide a breakaway coupling which will enable the outrigger booms of a spraying unit to swing freely with respect to the unit frame through a predetermined angle when an obstruction is encountered, yet which will return the outrigger booms to the normal spraying position when the obstruction is passed, and which will dispose the outrigger booms at an angle with respect to the unit frame when the booms have swung through an angle exceeding said predetermined angle.

Another critical problem which has confronted designers of spraying apparatus is the provision of a simplified means for changing the elevation of the spraying booms with respect to the ground. In known prior art devices it has been necessary to remove and replace several bolts to effect the desired change in height. Since this has proved to be a tedious and time-consuming operation, it is a still further object of the present invention to provide a new and improved latching mechanism which will enable the vehicle operator to adjust the height of the spraying booms with a minimum amount of effort.

Other objects and advantages of the invention will hereinafter become more fully apparent from the following description of the annexed drawings which illustrate a preferred embodiment, and wherein:

FIGURE 1 is a side elevational view of a trailing type sprayer employing the present invention;

FIGURE 2 is a rear view of the apparatus set forth in FIGURE 1, with certain parts broken away for clarity;

FIGURE 3 is a sectional view taken along the line 3—3 of FIGURE 2;

FIGURE 4 is a plan view of the breakaway coupling of the present invention; and

FIGURE 5 is a side elevational view of the coupling set forth in FIGURE 4.

Referring now to the drawings, wherein like reference characters designate like or corresponding parts throughout the several views, the fluid-containing tank is indicated in its entirety by reference numeral 10 in FIGURE 1. Tank 10 is supported upon a frame indicated generally at 11, which includes front and rear transversely extending beam members 12 and 13, respectively, and side beam members 14, only one of which is shown. Tank 10 is secured to frame 11 by spaced-apart straps 15, only one of which is shown, which are fixedly secured at one end to front beam 12, and are adjustably secured at the other end to rear beam 13 by threaded hook 16. Ground-engaging wheels 17, only one of which is shown, are provided at the opposite sides of frame 11, and are rotatably mounted upon axle 18 which is provided at the convergent point of depending arms 19 and 20. A hitch structure 21 is secured to frame 11 by bracket 22, and extends forwardly thereof where it is adapted to be connected to a source of motive power, such as, a tractor, truck, or the like, not shown.

The fluid-dispensing booms are mounted upon a subframe indicated generally at 23, which includes a pair of side rail members 24 and a transversely extending top rail member 25. As is best seen in FIGURE 2, side rail members 24 are provided with a plurality of longitudinally spaced apertures 24', the purpose of which will hereinafter become more fully apparent. Subframe 23 is secured to main frame 11 by the cooperation of height latch 27 with spaced-apart arms 26, as will be best understood from an examination of FIGURES 2 and 3.

Height latch 27 includes a first U-shaped member 28 having a first leg 30 and a second leg 29 substantially longer than leg 30 and secured to arms 26 as by welding or the like. U-shaped members 28 act as guiding means for side beams 24 which are slidably received in the crotch formed between arms 29 and 30. A second U-shaped member 31 is fixedly secured to arm 30 of member 28. Member 31 and arms 29 and 30 are apertured for reception of locking pin 32, which is adapted to pass through one of the apertures 24' formed in side beam 24 to lock the subframe 23 at a predetermined position. Spring 33 is engageable with retainer pin 34 that is provided in lock pin 32 to bias lock pin 32 through the apertures formed in arms 29 and 30 and through side beam 24.

Thus it should be apparent that when it is desired to adjust subframe 23 with respect to the main frame 11, it is necessary to merely remove locking pin 32 to the broken line position indicated at 32' in FIGURE 3, which frees side beams 24 for vertical movement with respect to the guiding member 28. Side beams 24 are then moved to the desired position and apertures 24' are aligned with the corresponding apertures in arms 29 and 30, and then locking pin 32 is reengaged through the aforesaid apertures to lock the subframe 23 in this position.

The novel breakaway coupling of the present invention will be best understood from an examination of FIGURE 2, FIGURE 4 and FIGURE 5. In FIGURE 2 it will be noted that the central fluid-dispensing boom section 35, which extends transversely between side frame members 24, communicates with a bore formed in the first coupling half 36. A second bore is formed in the lower portion of coupling half 36 and receives a conduit member 37 which extends to and communicates with a fluid control source, not shown, associated with tank 10. Coupling half 36 is further provided with an apertured upper portion 38 which is adapted to be secured to upright 24 by bolt 39 or the like. Coupling half 36 is still further provided with a ring or plate portion 40 having four conical teeth 41 extending upward therefrom and spaced peripherally therearound. Each tooth 41 is triangularly shaped in cross-section, and is provided with an inclined face portion 41'.

A second coupling half 42 is provided with an apertured upper portion 43, which is adapted to receive pivot pin 44. Ring or plate section 50 is provided with a pair of outwardly extending apertured arms 45 and 46 which are pivotally mounted upon pin 44. Plate 50 is further provided with four downwardly extending conically shaped teeth 51 spaced peripherally therearound. Teeth 51 are triangularly shaped in cross-section, and are provided with inclined faces 51'. Teeth 41 and 51 are substantially identical in size, so that when surfaces 41' and 51' are placed in interfacial contact, a compact structure is produced, such as shown in FIGURE 2. Plates 40 and 50 are apertured adjacent their central portions for reception of a bolt 47 which functions to hold the plates together by virtue of the action of nut 48 upon spring 49. As can be readily understood, the resilient force exerted by spring 49 can be adjusted by threading nut 48 upon bolt 47.

Coupling half 42 is bored for reception of outwardly extending fluid-dispensing boom 53. Fluid is conveyed from tank 10 through control means, not shown, to outer boom 53 by a flexible conduit member 54 that is connected with fitting 55 which communicates with the bore formed in coupling half 42.

In order to facilitate the transporting of the spraying apparatus means are provided for pivoting outer booms 53 about pin 44 into an upraised position where they can be secured to upper beam 25. The aforesaid pivoting means include a pulley 56 mounted upon beam 25, and a clamp 57 secured adjacent the central portion of boom 53. A cable 58 is secured to clamp 57, is trained over pulley 56, and extends forwardly of the spraying apparatus where it is adapted to be manipulated by the vehicle operator to swing booms 53 into the transport position.

From the foregoing it should be apparent that in operation with the outrigger booms 53 in the outwardly extending position, when an obstruction is encountered by boom 53, face 51' of coupling half 50 will ride up upon face 41' of coupling half 40 against the bias of spring 49. The movement of face 51' with respect to face 41' is accompanied by the pivoting of boom 53, as is best illustrated in FIGURE 4. It should be noted that with four projections 41 on coupling half 40, boom 53 is capable of pivoting 45° before it assumes the breakaway position which is disposed at right angles to the direction of travel. Furthermore, it should be observed that the action of spring 49 upon the coupling halves will resiliently resist their relative movement, and thus inhibit the breakaway movement of the outrigger booms when the outrigger boom has swung through an angle less than 45°.

It should be understood, of course, that the foregoing disclosure relates to only a preferred embodiment of the invention, and that numerous modifications or alterations may be made therein without departing from the spirit and the scope of the invention as set forth in the appended claims.

What is claimed is:

1. A breakaway coupling adapted to pivotally secure the outrigger boom of a spraying machine to the main frame thereof comprising: a first coupling-half mounted on said frame and having a plate portion disposed in a substantially horizontal plane, a second coupling-half mounted on said outrigger boom having a plate portion disposed in a substantially horizontal plane, each of said coupling plate portions having complementary cooperating positioning means formed thereon adapted to hold said boom alternately in an operating position extending laterally of the frame and a non-operating position at an angle to said operating position, said positioning means including a first member formed on one of said plate portions having an inclined surface and a second member formed on the other plate portion engageable with said inclined surface when the boom is disposed in said operating position, spring means associated with said plate portions for biasing the boom to said operating position, said spring means being yieldable upon pivoting of the boom when encountering an obstruction to accommodate movement of said second member over the inclined surface of said first member in response to pivotal movement of said boom and to automatically return the boom to said operating position, the length of said inclined surface being sufficient to permit the boom to swing approximately one-half the distance to said non-operating position and automatically return the boom, in response to the bias of said spring means, to its operating position, and means in the mounting of said first coupling half on the main frame for adjusting said first coupling half vertically to vary the distance between said boom and the ground while accommodating the pivoting of said boom.

2. The invention set forth in claim 1, wherein said first coupling-half is mounted on a movable subframe and said adjusting means comprises guide means carried by the main frame slidably receiving the subframe, spaced locking means are provided on the subframe, latch means are movably mounted on the guide means selectively engageable with the locking means and spring means are carried by the guide means biasing said latch means into engagement with the locking means.

3. Apparatus for vertically adjusting the outrigger boom of a spraying machine having a main frame comprising: guide means secured to said main frame, a generally vertically extending subframe slidably receivable in said guide means, spaced apart locking means on the subframe, a latching element movably mounted on said guide means and selectively engageable with said locking means, spring means mounted on said guide means operatively engageable with said latching element for biasing said latching element into engagement with said locking means, and means for mounting the outrigger boom on the subframe including vertical pivot means accommodating horizontal swinging of the boom relative to the subframe and to the main frame.

References Cited by the Examiner

UNITED STATES PATENTS

| 740,527 | 10/03 | Carter | 287—95 |
|---|---|---|---|
| 1,170,585 | 2/16 | Waterman | 172—269 |
| 1,632,036 | 6/27 | Mullen | 248—295 |
| 2,488,316 | 11/49 | Mosby | 248—289 |
| 2,548,209 | 4/51 | Foster | 239—167 X |
| 2,564,041 | 8/51 | Vogel | 239—168 X |
| 2,575,521 | 11/51 | Ireland | 239—168 |
| 2,610,076 | 9/52 | Walsh | 287—96 |
| 3,023,970 | 3/62 | Knoell | 239—167 |

FOREIGN PATENTS 717,249 10/54 Great Britain.

CLAUDE A. LE ROY, *Primary Examiner.*

ROBERT A. O'LEARY, *Examiner.*